United States Patent
Breuer et al.

(10) Patent No.: US 9,862,058 B2
(45) Date of Patent: Jan. 9, 2018

(54) METHOD FOR LASER WELDING ONE OR MORE WORKPIECES MADE OF HARDENABLE STEEL IN A BUTT JOINT

(71) Applicant: WISCO Tailored Blanks GmbH, Duisburg (DE)

(72) Inventors: Arndt Breuer, Bergisch Gladbach (DE); Christian Both, Duisburg (DE)

(73) Assignee: WISCO Tailored Blanks GmbH, Duisburg (DE)

( * ) Notice: Subject to any disclaimer, the term of this patent is extended or adjusted under 35 U.S.C. 154(b) by 0 days.

(21) Appl. No.: 15/118,921

(22) PCT Filed: Jan. 29, 2015

(86) PCT No.: PCT/EP2015/051780
§ 371 (c)(1),
(2) Date: Aug. 15, 2016

(87) PCT Pub. No.: WO2015/121074
PCT Pub. Date: Aug. 20, 2015

(65) Prior Publication Data
US 2016/0368094 A1  Dec. 22, 2016

(30) Foreign Application Priority Data
Feb. 17, 2014  (DE) .......... 10 2014 001 979

(51) Int. Cl.
B23K 26/00 (2014.01)
B23K 26/26 (2014.01)
(Continued)

(52) U.S. Cl.
CPC ............ *B23K 26/26* (2013.01); *B23K 26/123* (2013.01); *B23K 26/32* (2013.01);
(Continued)

(58) Field of Classification Search
CPC .... B23K 26/26; B23K 26/32; B23K 35/0261; B23K 26/123; B23K 35/3066; B23K 35/3073; B23K 35/3093; B23K 35/3086
(Continued)

(56) References Cited

U.S. PATENT DOCUMENTS 8,614,008 B2  12/2013  Canourgues et al.
9,205,512 B2  12/2015  Gu et al.
(Continued)

FOREIGN PATENT DOCUMENTS

DE   102010018687 A1   10/2011
KR   10-2015-0095649 A   8/2015
(Continued)

OTHER PUBLICATIONS

Automobile, Catalog 2000, Usinor Auto, "Usibor".
Boisselier et al., "Le soudage par laser"; Publication Air Liquide; Mar. 1998; pp. 36-37.

*Primary Examiner* — Thien S Tran
(74) *Attorney, Agent, or Firm* — The Webb Law Firm

(57) ABSTRACT

A method for laser welding one or more workpieces made of press-hardenable steel in a butt joint, wherein the workpiece or workpieces have a thickness of between 0.5 and 1.8 mm, and/or a jump in thickness of between 0.2 and 0.4 mm occurs at the butt joint, and wherein laser welding is carried out with the feed of filler wire into the molten bath, which is generated only by at least one laser beam. The filler wire contains at least one alloy element from the group comprising manganese, chromium, molybdenum, silicon and/or nickel, which alloy element promotes the formation of austenite in the molten bath generated by the laser beam, wherein said at least one alloy element is present in the filler wire in a mass percentage greater by at least 0.1 wt. % than in the steel of the workpiece or workpieces and the work- (Continued)

piece or workpieces used are non-coated or the coating thereof is partially removed.

7 Claims, 1 Drawing Sheet

(51) Int. Cl.

| | |
|---|---|
| *B23K 26/32* | (2014.01) |
| *B23K 35/30* | (2006.01) |
| *B23K 35/02* | (2006.01) |
| *C22C 38/02* | (2006.01) |
| *B23K 26/12* | (2014.01) |
| *C22C 38/00* | (2006.01) |
| *C22C 38/06* | (2006.01) |
| *C22C 38/22* | (2006.01) |
| *C22C 38/28* | (2006.01) |
| *C22C 38/32* | (2006.01) |
| *C22C 38/38* | (2006.01) |
| *C22C 38/44* | (2006.01) |
| *C22C 38/58* | (2006.01) |
| *B23K 101/00* | (2006.01) |
| *B23K 103/04* | (2006.01) |

(52) U.S. Cl.
CPC ...... *B23K 35/0255* (2013.01); *B23K 35/0261* (2013.01); *B23K 35/3053* (2013.01); *B23K 35/3066* (2013.01); *B23K 35/3073* (2013.01); *B23K 35/3086* (2013.01); *B23K 35/3093* (2013.01); *C22C 38/002* (2013.01); *C22C 38/02* (2013.01); *C22C 38/06* (2013.01); *C22C 38/22* (2013.01); *C22C 38/28* (2013.01); *C22C 38/32* (2013.01); *C22C 38/38* (2013.01); *C22C 38/44* (2013.01); *C22C 38/58* (2013.01); *B23K 2201/006* (2013.01); *B23K 2203/04* (2013.01)

(58) Field of Classification Search
USPC .......... 219/75, 76.1, 121.64, 121.66, 146.23
See application file for complete search history.

(56) References Cited

U.S. PATENT DOCUMENTS

| | | | |
|---|---|---|---|
| 2008/0011720 A1 | 1/2008 | Briand et al. | |
| 2011/0000890 A1* | 1/2011 | Arjakine | .................. B23K 9/12 |
| | | | 219/75 |
| 2012/0024828 A1* | 2/2012 | Oowaki | ................ B23K 9/1093 |
| | | | 219/121.64 |
| 2012/0279621 A1 | 11/2012 | Gerber et al. | |
| 2013/0098878 A1 | 4/2013 | Briand et al. | |
| 2013/0105446 A1 | 5/2013 | Briand et al. | |
| 2014/0003860 A1 | 1/2014 | Evangelista et al. | |
| 2015/0030382 A1* | 1/2015 | Cretteur | ............. B23K 35/3053 |
| | | | 403/272 |
| 2015/0129559 A1* | 5/2015 | Fairchild | .............. B23K 35/308 |
| | | | 219/73 |
| 2015/0306702 A1 | 10/2015 | Breuer et al. | |

FOREIGN PATENT DOCUMENTS

| | | |
|---|---|---|
| RU | 2038937 C1 | 7/1995 |
| RU | 2373037 C1 | 11/2009 |
| WO | 2011121118 A2 | 10/2011 |
| WO | 2012007663 A1 | 1/2012 |
| WO | 2012007664 A1 | 1/2012 |
| WO | 2012079163 A1 | 6/2012 |
| WO | 2013014481 A1 | 1/2013 |
| WO | 2014005041 A1 | 1/2014 |
| WO | 2014018206 A1 | 1/2014 |

* cited by examiner

METHOD FOR LASER WELDING ONE OR MORE WORKPIECES MADE OF HARDENABLE STEEL IN A BUTT JOINT

CROSS-REFERENCE TO RELATED APPLICATIONS

This application is the United States national phase of International Application No. PCT/EP2015/051780 filed Jan. 29, 2015, and claims priority to German Patent Application No. 10 2014 001 979.9 filed Feb. 17, 2014, the disclosures of which are hereby incorporated in their entirety by reference.

BACKGROUND OF THE INVENTION

The invention relates to a method for laser welding one or more workpieces made of press-hardenable steel, in particular manganese-boron steel, in a butt joint, in which method the workpiece or workpieces have a thickness of between 0.5 and 1.8 mm, and/or a jump in thickness of between 0.2 and 0.4 mm occurs at the butt joint, and in which method laser welding is carried out with the feed of filler wire into the molten bath which is generated by at least one laser beam, the molten bath being generated only by the at least one laser beam.

FIELD OF THE INVENTION

Tailored sheet steel blanks (so-called tailored blanks) are used in automotive engineering to meet the high demands imposed on crash safety with the lowest possible weight of the bodywork. For this purpose, individual blanks or strips of a different material quality and/or sheet thickness are joined together by laser welding in a butt joint. In this way, different areas of the finished bodywork component can be adapted to different stresses. Thus, relatively thick or higher-strength sheet steel can be used in high-stress areas and thinner sheets or sheets of relatively soft drawing grades can be used in the other areas. Additional reinforcing parts are superfluous on the bodywork due to the tailored sheet metal blanks. This saves material and makes it possible to reduce the total weight of the bodywork.

In recent years, boron-alloyed steels, in particular manganese-boron steels have been developed which achieve high strengths, for example tensile strengths within a range of 1500 to 2000 MPa, during hot forming with rapid cooling. In the initial state, manganese-boron steels typically have a ferritic-pearlitic structure and have strengths of approximately 600 MPa. However, by press hardening, i.e. by heating to the austenitising temperature and subsequent rapid cooling in the moulding press, a martensitic structure can be set, so the steels thus treated can achieve tensile strengths ranging from 1500 to 2000 MPa.

The bodywork components, for example B-pillars, produced from tailored steel blanks of this type have a perfect hardness profile up to a particular sheet thickness or up to a particular jump in thickness. However, it has been found that particularly for a sheet thickness of between 0.5 and 1.8 mm, or also with a jump in thickness of between 0.2 and 0.4 mm, the problem arises that the laser weld seam does not harden adequately during hot forming (press hardening). A martensitic structure is then only partly produced in the region of the weld seam, and so when the finished component is stressed, the weld seam can fail. This problem is presumably associated with the fact that, particularly in the case of a jump in thickness, adequate contact with the cooled forming tool or cooling tool cannot usually be ensured and thus the weld seam cannot be fully transformed into martensite.

US 2008/0011720 A1 describes a laser arc hybrid welding method in which blanks of manganese-boron-steel which have an aluminium-containing surface layer are joined together in a butt joint, the laser beam being combined with at least one electric arc to melt the metal at the butt joint and to weld the blanks together. In this respect, the electric arc is emitted by a tungsten welding electrode or forms at the tip of a filler wire during the use of a MIG welding torch. The filler wire can contain elements (for example Mn, Ni and Cu) which induce the transformation of the steel into an austenitic structure and promote the maintenance of the austenitic transformation in the molten bath.

The objective of this known laser arc hybrid welding method is to be able to weld heat-formable blanks of manganese-boron steel, which are provided with an aluminium-silicon-based coating, without previously removing the coating material in the region of the weld seam to be produced, the intention nevertheless also being to ensure that aluminium located at the abutting ends of the blanks does not lead to a reduction in the tensile strength of the component in the seam. The aim of providing an electric arc downstream of the laser beam is to homogenise the molten bath and thereby to eliminate local concentrations of aluminium greater than 1.2 wt. % which produce a ferritic structure.

This known hybrid welding method has relatively high energy consumption due to the generation of the electric arc.

SUMMARY OF THE INVENTION

The object of the present invention is to provide a laser welding method by which workpieces of press-hardenable steel, in particular manganese-boron steel, which have a thickness of between 0.5 and 1.8 mm, and/or in which a jump in thickness of between 0.2 and 0.4 occurs at a butt joint, can be joined in a butt joint to produce tailored workpieces, in particular tailored blanks, the weld seam of which can be reliably hardened into a martensitic structure during hot forming (press hardening). Furthermore, the method should be distinguished by high efficiency and relatively low energy consumption.

To achieve this object, a method having the features of claim 1 is proposed. Preferred and advantageous embodiments of the method according to the invention are set out in the dependent claims.

The method according to the invention is used for laser welding one or more workpieces made of press-hardenable steel, in particular manganese-boron steel, in a butt joint, in which method the workpiece or workpieces have a thickness of between 0.5 and 1.8 mm, in particular between 0.5 and 1.6 mm, and/or a jump in thickness of between 0.2 and 0.4 mm, in particular between 0.2 and 0.3 mm, occurs at the butt joint. The laser welding is carried out with the feed of filler wire into the molten bath, which is generated by a laser beam. The method according to the invention is further characterised in that the filler wire contains at least one alloy element from the group comprising manganese, chromium, molybdenum, silicon and/or nickel, which alloy element promotes the formation of austenite in the molten bath generated by the laser beam, this at least one alloy element being present in the filler wire in a mass percentage greater by at least 0.1 wt. % than in the press-hardenable steel of the workpiece or workpieces, and the workpiece or workpieces used being uncoated or partly decoated.

The workpieces or tailored blanks produced according to the invention offer, in respect of hot forming (press hardening), a wider process window in which satisfactory hardening of the component, particularly also in the weld seam thereof, is achieved.

The method according to the invention can be used not only for joining together a plurality of steel blanks of a different material quality and/or sheet thickness in a butt joint, but also, for example, for laser welding a single plate-shaped or strip-shaped steel sheet, and in the latter case, the workpiece edges to be welded together are moved towards one another by forming, for example by folding or by roll forming, so that they are finally arranged facing one another in a butt joint.

To prevent the formation of a layer of scale on steel strips or steel sheets, they are usually provided with a coating based on aluminium or on aluminium-silicon. The method according to the invention can be employed using coated steel blanks or steel strips of this type and, according to an advantageous variant of the method according to the invention, the aluminium-based or aluminium-silicon-based coating is ablated along the abutting ends, to be welded together, before laser welding, such that the workpiece or workpieces used are partly decoated. This can be carried out using at least one energy beam, preferably a laser beam. A mechanical or high-frequency (HF) decoating procedure is also conceivable. In this way, it is possible to reliably prevent the weld seam from being impaired by coating material which has otherwise been unintentionally introduced therein and which can or would lead to interruptions in the hardness profile during hot forming (press hardening).

Uncoated steel blanks or steel strips can also be welded together according to the method of the invention.

In a preferred embodiment of the method according to the invention, the workpiece or workpieces is/are selected such that the steel thereof has the following composition: 0.16 to 0.50 wt. % C, max. 0.40 wt. % Si, 0.50 to 2.00 wt. % Mn, max. 0.025 wt. % P, max. 0.010 wt. % S, max. 0.60 5 wt. % Cr, max. 0.50 wt. % Mo, max. 0.050 wt. % Ti, 0.0008 to 0.0070 wt. % B and min. 0.010 wt. % Al, remainder Fe and unavoidable impurities. The components produced from a steel of this type have a relatively high tensile strength after press hardening.

More preferably used in the method according to the invention are blank-shaped or strip-shaped workpieces of press-hardenable steel which, after press hardening, have a tensile strength within a range of 1500 to 2000 MPa.

Another preferred embodiment of the method according to the invention is characterised in that the filler wire used therein has the following composition: 0.05 to 0.15 wt. % C, 0.5 to 2.0% wt. % Si, 1.0 to 2.5 wt. % Mn, 0.5 to 2.0 wt. % Cr+Mo, and 1.0 to 4.0 wt. % Ni, the remainder being Fe and unavoidable impurities. Tests have shown that a complete transformation of the weld seam into a martensitic structure can be ensured particularly reliably during subsequent press hardening with a filler wire of this type using the method according to the invention.

According to another preferred embodiment of the method according to the invention, the filler wire used therein has a carbon mass percentage which is lower by at least 0.1 wt. % than the press-hardenable steel of the workpiece or workpieces. A relatively low carbon content of the filler wire can prevent embrittlement of the weld seam. In particular, due to a relatively low carbon content of the filler wire, it is possible to achieve good residual extensibility at the weld seam.

Another advantageous embodiment of the method according to the invention provides that the filler wire is fed in a heated state into the molten bath. Consequently, it is possible to achieve a higher processing speed and/or higher efficiency. In this embodiment, less energy has to be expended using the laser beam to melt the filler wire. At least a length portion of the filler wire is preferably heated to a temperature of at least 50° C. before it is fed into the molten bath.

To prevent the weld seam from becoming brittle, another preferred embodiment of the method according to the invention provides that inert gas is applied to the molten bath during laser welding. Particularly preferably used as inert gas is pure argon, helium, nitrogen or the mixture thereof, or a mixture of argon, helium, nitrogen and/or carbon dioxide and/or oxygen.

In the following, the invention will be described in more detail with reference to schematic drawings, which show embodiments and in which:

DETAILED DESCRIPTION OF THE INVENTION

Figure 1:
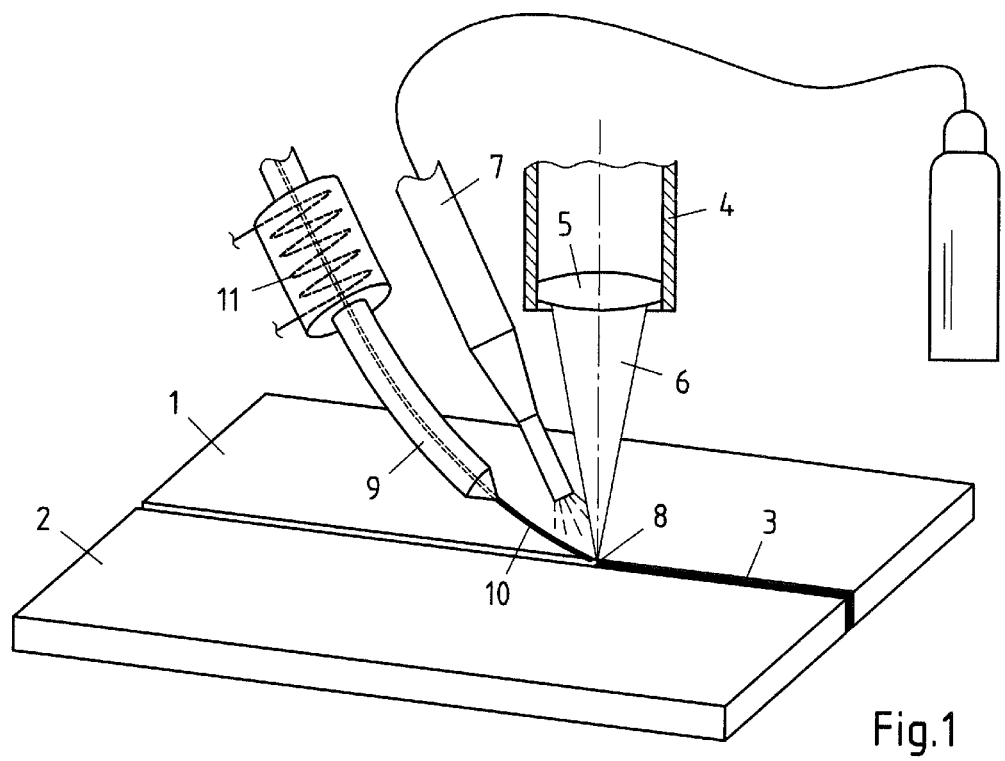
FIG. 1 is a perspective view of parts of a device for implementing the laser welding method according to the invention, two press-hardenable steel blanks of substantially the same thickness being welded together in a butt joint.

FIG. 1 schematically shows a device using which a laser welding method according to the invention can be carried out. The device comprises a support (not shown), on which two steel strips or steel blanks 1, 2 of different material qualities butt one another along the joint 3. For example, one workpiece 1 or 2 has a relatively soft drawing grade, while the other workpiece 2 or 1 consists of higher-strength sheet steel. At least one of the workpieces 1, 2 is produced from press-hardenable steel, for example from manganese-boron steel.

The workpieces 1, 2 are substantially of the same thickness. The thickness thereof is between 0.5 and 1.8 mm, for example 1.6 mm.

Outlined above the workpieces 1, 2 is a portion of a laser welding head 4 which is provided with both an optical system (not shown) to supply a laser beam, and a focussing lens 5 for the laser beam 6. Furthermore, a line 7 is arranged on the laser welding head 4 to supply inert gas. The opening of the inert gas line 7 is substantially directed onto the focusing region of the laser beam 6 or onto the molten bath 8 generated by the laser beam 6. The inert gas used is preferably pure argon or, for example, a mixture of argon, helium and/or carbon dioxide. In addition, associated with the laser welding head 4 is a wire feed apparatus 9, by which a specific additional material in the form of a wire 10 is fed into the molten bath 8 and is also melted by the laser beam 6. The filler wire 10 is fed in a heated state into the molten bath 8. For this purpose, the wire feed apparatus 9 is fitted with at least one heating element 11, for example with a heating coil which surrounds the wire 10. The heating element 11 preferably heats the filler wire 10 to a temperature of at least 50° C., more preferably to at least 90° C.

Figure 2:
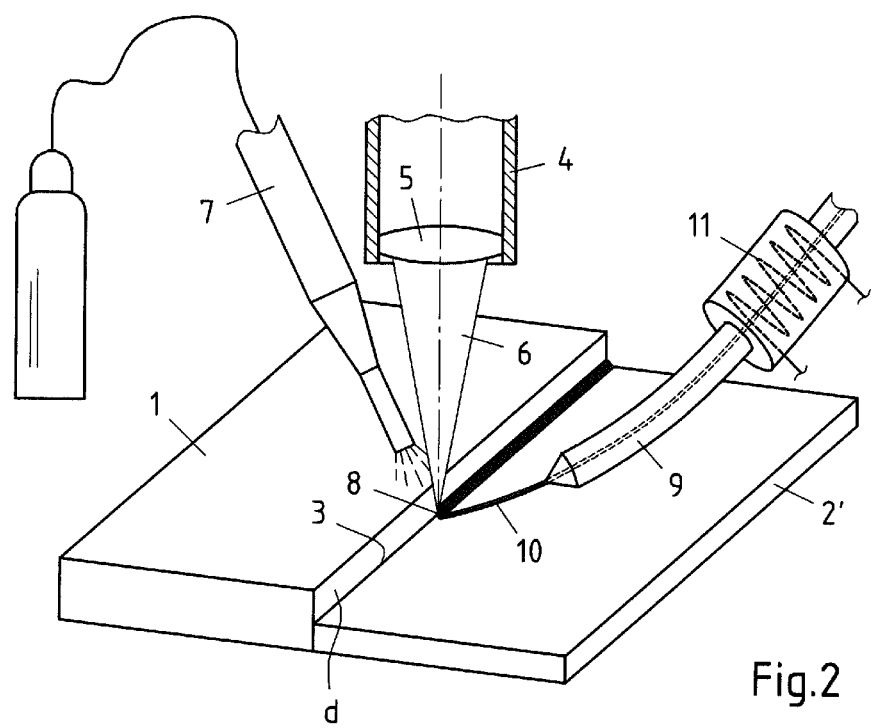
FIG. 2 is a perspective view of parts of a device for implementing the laser welding method according to the invention, in which two press-hardenable steel blanks which differ in thickness being welded together in a butt joint.

The embodiment shown in FIG. 2 differs from the embodiment according to FIG. 1 in that the workpieces 1, 2' are of different thicknesses, so there is a jump in thickness d of between 0.2 and 0.4 mm, for example 0.3 mm at the butt joint 3. For example, one workpiece 2' has a sheet thickness within a range of 1.2 mm to 1.3 mm, while the other workpiece 1 has a sheet thickness within a range of 1.4 mm to 1.5 mm. Furthermore, the workpieces 1, 2' which are to be joined together in the butt joint 3 can also differ from one another in their material quality. For example, the thicker blank 1 is produced from higher-strength sheet steel, whereas the thinner steel blank 2' has a relatively soft drawing grade.

The press-hardenable steel, of which at least one of the workpieces 1, 2 or 2' to be joined together in the butt joint 3 consists, can have the following chemical composition for example:
- max. 0.45 wt. % C,
- max. 0.40 wt. % Si,
- max. 2.0 wt. % Mn,
- max. 0.025 wt. % P,
- max. 0.010 wt. % S,
- max. 0.8 wt. % Cr+Mo,
- max. 0.05 wt. % Ti,
- max. 0.0050 wt. % B, and
- min. 0.010 wt. % Al,
- remainder Fe and unavoidable impurities.

The workpieces or steel blanks 1, 2 and 2' can be uncoated or can be provided with a coating, in particular with an Al—Si layer. In the delivery state, i.e. before a heat treatment and rapid cooling, the yield strength Re of the press-hardenable steel blanks 1, 2 and/or 2' is preferably at least 300 MPa; the tensile strength Rm thereof is at least 480 MPa, and the elongation at break $A_{80}$ thereof is at least 10%. After hot forming (press hardening), i.e. after austenitising at approximately 900 to 920° C. and subsequent rapid cooling, these steel blanks have a yield strength Re of approximately 1,100 MPa, a tensile strength Rm of approximately 1,500 to 2000 MPa and an elongation at break $A_{80}$ of approximately 5.0%.

If the workpieces or steel blanks 1, 2 and/or 2' are provided with an aluminium coating, in particular with an Al—Si coating, said coating is ablated or partly removed before laser welding in the peripheral region along the abutting ends to be welded together. Aluminium coating material which adheres to the abutting ends or cut edges 3 is also removed, if appropriate. The aluminium coating material can preferably be ablated (removed) by means of at least one laser beam.

The filler wire 10 used has the following chemical composition, for example:
- 0.1 wt. % C,
- 0.8 wt. % Si.
- 1.8 wt. % Mn,
- 0.35 wt. % Cr,
- 0.6 wt. % Mo, and
- 2.25 wt. % Ni,
- remainder Fe and unavoidable impurities.

The manganese content of the filler wire 10 is always greater than the manganese content of the press-hardenable workpieces 1, 2 and/or 2'. The manganese content of the filler wire 10 is preferably approximately 0.2 wt. % higher than the manganese content of the press-hardenable workpieces 1, 2 and/or 2'. Furthermore, it is favourable if the content of chromium and molybdenum of the filler wire 10 is also higher than in the press-hardenable workpieces 1, 2 and/or 2'. The combined chromium-molybdenum content of the filler wire 10 is preferably approximately 0.2 wt. % higher than the combined chromium-molybdenum content of the press-hardenable workpieces 1, 2 and/or 2'. The nickel content of the filler wire 10 is preferably within a range of 1 to 4 wt. %. Furthermore, the filler wire 10 preferably has a lower carbon content than the press-hardenable steel of the workpieces 1, 2 and/or 2'.

The invention claimed is:

1. A method for laser welding one or more workpieces made of press-hardenable steel in a butt joint, wherein the one or more workpieces have a thickness of between 0.5 and 1.8 mm, or a jump in thickness of between 0.2 and 0.4 mm occurs at the butt joint, or the one or more workpieces have a thickness of between 0.5 and 1.8 mm and a jump in thickness of between 0.2 and 0.4 mm occurs at the butt joint, comprising the steps of:
generating a molten bath with only at least one laser beam;
carrying out the laser welding with a feed of filler wire into the molten bath,
wherein the filler wire contains at least one alloy element from the group comprising manganese, chromium, molybdenum, silicon and nickel, wherein the at least one alloy element promotes formation of austenite in the molten bath generated by the at least one laser beam,
wherein the at least one alloy element is present in the filler wire in a mass percentage greater by at least 0.1 wt. % than in the press-hardenable steel of the one or more workpieces,
wherein the one or more workpieces used are non-coated or partially de-coated by ablation of their coating before the laser welding in a peripheral region along an abutting to be welded together,
wherein filler wire comprises:
0.05 to 0.15 wt. % C,
0.5 to 2.0 wt. % Si,
1.0 to 2.5 wt. % Mn,
0.5 to 2.0 wt. % Cr+Mo, and
1.0 to 4.0 wt. % Ni,
remainder Fe and unavoidable impurities, and
wherein the filler wire has a carbon mass percentage which is lower by at least 0.1 wt. % than the press-hardenable steel of the workpiece or workpieces.

2. The method according to claim 1, wherein the steel of the one or more workpieces has the following composition:
0.16 to 0.50 wt. % C,
max. 0.40 wt. % Si,
0.50 to 2.00 wt. % Mn,
max. 0.025 wt. % P,
max. 0.010 wt. % S,
max. 0.60 wt. % Cr,
max. 0.50 wt. % Mo,
max. 0.050 wt. % Ti,
0.0008 to 0.0070 wt. % B, and
min. 0.010 wt. % Al,
remainder Fe and unavoidable impurities.

3. The method according to claim 1, wherein the filler wire is fed in a heated state to the molten bath.

4. The method according to claim 3, wherein at least a length portion of the filler wire is heated to a temperature of at least 50° C. before it is fed into the molten bath.

5. The method according to claim 1, wherein inert gas is applied to the molten bath during laser welding.

6. The method according to claim 5, wherein the inert gas used is pure argon or a mixture of argon and carbon dioxide.

7. The method according to claim 1, wherein the partially de-coated one or more workpieces used have a surface layer based on aluminium or on aluminium-silicon.

* * * * *